United States Patent [19]
Kladitis

[11] 4,327,961
[45] May 4, 1982

[54] NON-STEAMING MIRROR

[76] Inventor: Nicholas S. Kladitis, 1636 Ridge Ave., Sharpsville, Pa. 16150

[21] Appl. No.: 164,495

[22] Filed: Jul. 2, 1980

[51] Int. Cl.³ .................... A45D 27/22; G02B 7/18
[52] U.S. Cl. .................... 350/66; 132/80 A; D28/68
[58] Field of Search ............ 350/61, 63, 66, 308; 132/79 G, 79 R, 80 A; D28/65–72; 214/219

[56] References Cited
U.S. PATENT DOCUMENTS

| | | | |
|---|---|---|---|
| 1,843,067 | 1/1932 | Terra | 350/66 |
| 3,373,448 | 3/1968 | Butler | 350/61 |
| 3,512,259 | 5/1970 | Gordon et al. | 350/308 |
| 4,150,869 | 4/1979 | Hansen | D28/68 |

FOREIGN PATENT DOCUMENTS

52-32753  5/1975  Japan ..................... 350/61

*Primary Examiner*—Jon W. Henry
*Attorney, Agent, or Firm*—Robert D. Yeager; Andrew J. Cornelius

[57] ABSTRACT

A mirror includes a reflective surface that will not become fogged when the mirror is used in a steamy or humid environment such as a shower area. The mirror comprises a reflective member including a reflective surface fixed to a housing so that a housing compartment is defined thereby. An opening formed in the housing communicates with the housing compartment enabling a user to fill the housing compartment with water. The user fills the housing compartment with hot tap water so that the reflective surface will not become fogged when the mirror is used in a shower area. The mirror can include a base fixed to the housing for storing shaving articles, such as shaving soap. The base can have a base compartment formed therein that communicates with the housing compartment. Accordingly, the base compartment can be filled with hot water to heat the shaving soap.

8 Claims, 6 Drawing Figures

NON-STEAMING MIRROR

BACKGROUND OF THE INVENTION

1. Field of the Invention

This invention relates to mirrors and, more particularly, to a mirror for use in steamy or humid environments.

2. Description of the Prior Art

Many people like to shave in a shower area immediately after they have taken a hot shower there and, possibly, while the shower is still operating. Those people believe that human skin and hair remain softer in a warm, steamy environment and, therefore, that it is less likely that they will cut themselves while shaving in such an environment than while shaving in other environments.

However, most men cannot shave without using a mirror. Of course, the reflective surface of a conventional mirror will become steamed or fogged because the warm water droplets suspended in the air in the shower area condense on the cooler reflective surface thereby rendering the reflective surface useless as a shaving aid.

Therefore, workers in the art have attempted to heat the reflective surfaces of mirrors that are to be used in steamy, humid environments to prevent steaming or fogging thereof. Attempts have been made to heat the reflective surfaces of mirrors with electric coils. An example of a device employing such a technique can be found in U.S. Pat. No. 3,530,275 issued to Rust. The disadvantages associated with the use of such a device in a shower environment are relatively clear. Such a device would be somewhat expensive to produce as well as potentially dangerous when used in a shower area because of the possibility of the shower water causing a short circuit in the mirror and an electric shock to the user.

Other workers have tried to heat the reflective surfaces of mirrors by directing hot air thereon. Examples of devices employing such a concept can be found in U.S. Pat. Nos. 2,617,701 and 4,037,079. Again, such devices are relatively costly and inappropriate for use in wet environments.

Also, workers have attempted to heat the reflective surfaces of mirrors by directing warm shower water against the rear surfaces thereof. Examples of mirrors through which shower water is continuously circulated directly from the shower head or neck can be seen in U.S. Pat. Nos. 3,708,218 issued to Smillie and 4,150,869 issued to Hansen. One major disadvantage associated with the use of such mirrors is the effort that must be expended by the user to connect the plumbing of the mirror to that of the shower head. Again, such units are relatively costly to manufacture. An example of a mirror that can be fixed to a shower head so that the stream of shower water is directed continuously against the rear surface of the reflective surface of a mirror can be found in U.S. Pat. No. 4,072,397 issued to Ross.

In addition, water flow through the mirror disclosed by Smillie may be impeded by the relatively small diameter of the inlet tube of the mirror, the extreme change in direction made by the stream of shower water as it enters the mirror, and the numerous direction changes the stream must make as it passes through the mirror.

There are several common disadvantages associated with mirrors disclosed by Smillie, Hansen and Ross. First, those mirrors must be placed in a specific location within the shower area; in particular, they must be placed very close to the shower head and, in the case of the mirror disclosed in the Ross patent, must be placed within the stream of shower water. A significant disadvantage associated with using a mirror that is placed near or in the stream of shower water is that the shower water will wash the shaving soap from the user's face and neck. Moreover, and more importantly, such devices are limited in that the temperature of the water heating the mirror must be the same as the temperature of the shower water. To completely prevent condensation of water on or fogging of a mirror, the temperature of the reflective surface of the mirror that is exposed to the steam or vapor must be raised to at least 5° Fahrenheit above the ambient temperature of the shower area. It is not possible to achieve such an effect through the use of the mirrors disclosed in the Smillie, Hansen and Ross patents because the reflective surfaces thereof cannot become any hotter than the surrounding air since the same source heats both the mirror and the surrounding air.

Moreover, since Smillie, Hansen and Ross require that water be directed continuously against the rear of the reflective surfaces of their mirrors, use of such mirrors necessitates using significantly more water and energy than would be used during a normal shower.

Accordingly, there exists a need for a mirror that completely prevents the fogging of the reflective surface thereof, that is safe for use in a wet environment, that is relatively inexpensive to produce, is easy to use, and, if so desired, uses little more water and energy than is used during a normal shower.

SUMMARY OF THE INVENTION

A nonfogging mirror for use in steamy environments, such as a shower area, is provided. The reflective surface of the mirror of the present invention can be heated to a temperature in excess of 5° Fahrenheit of the temperature of the surrounding shower area and, therefore, will not become fogged or steamed while being used therein.

The mirror includes a housing, a reflective member, having a reflective surface, fixed to the housing such that the housing and the reflective member define a liquid-tight housing compartment and apparatus for temporarily fixing the mirror to a stationary object within the shower area. The housing has an opening formed therein that communicates with the housing compartment so that the housing compartment can be filled with hot water.

Accordingly, the user of the present invention can fill the housing compartment with hot tap water prior to taking a shower. The hot tap water can be much hotter than the temperature of the water with which the user plans to take a shower, although the temperature of the tap water need be only 5° Fahrenheit higher than the temperature of the shower water to completely prevent fogging of the mirror. When the user has finished showering and shaving, the user need only orient the mirror so that the tap water runs out of the housing compartment to initialize the mirror for the next shower and shave cycle.

The housing can be constructed of any suitable material. Preferably, the housing is constructed of a heat insulating material, such as blow molded plastic. Although the housing compartment can be of any shape, it is preferable that it be of a shape to facilitate the flow of liquid therethroughout. The reflective member should be fixed to the housing such that liquid disposed within the housing compartment is in contact with or close proximity to the rear surface of the reflective member. The reflective member can be plexiglass having one surface that is coated with a reflective material. If the reflective member is plastic, it can be glued or welded ultrasonically to a plastic housing.

The apparatus for fixing the mirror within the shower area can be a rope, a suction cup or a plurality thereof, a hook, or any other suitable apparatus. Preferably, the reflective member is joined to the housing so that the top of the reflective member is tilted toward the user when the mirror is fixed within the shower area. Such an orientation retards the accumulation of water on the reflective surface.

Also, a base may be fixed to the housing so that the user can store thereon shaving soap, a razor, a shaving brush or other shaving articles. The walls of the base can define a base compartment that communicates with the housing compartment. Accordingly, hot water can fill the base compartment and heat the shaving soap disposed thereon.

The present invention is useful for providing an individual with a mirror that can be used by that individual in a steamy shower area while shaving. The present invention is safe, relatively inexpensive, easy to use, and, if desired, uses little more energy and water than is used during a conventional shower.

BRIEF DESCRIPTION OF THE DRAWINGS

The following description of the preferred embodiments of the present invention can be understood better by referring to the drawings herein in which.

DETAILED DESCRIPTION OF THE PREFERRED EMBODIMENTS

Figure 1:
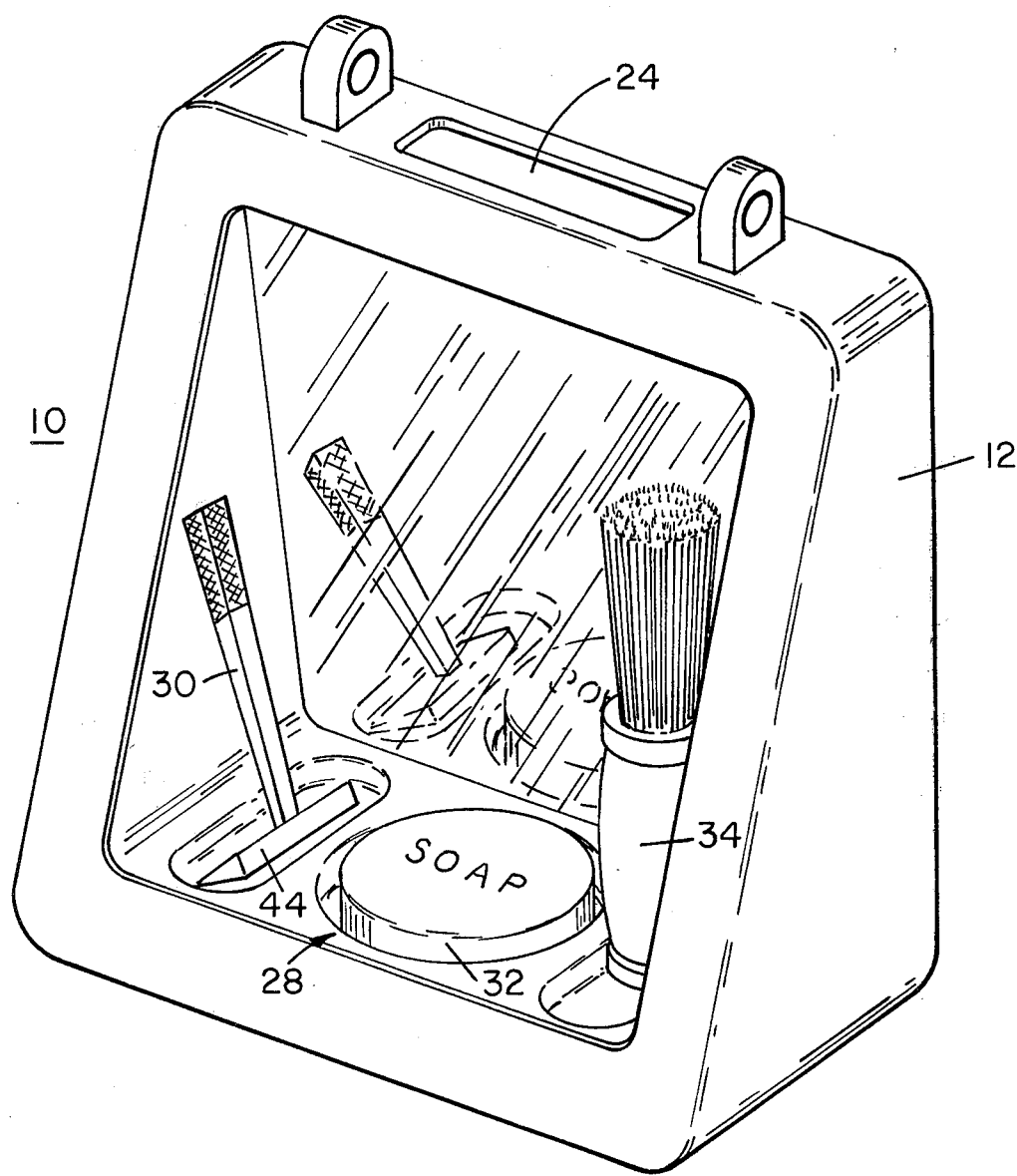
FIG. 1 is an isometric view of a mirror constructed according to the provisions of the present invention.
Figure 2:
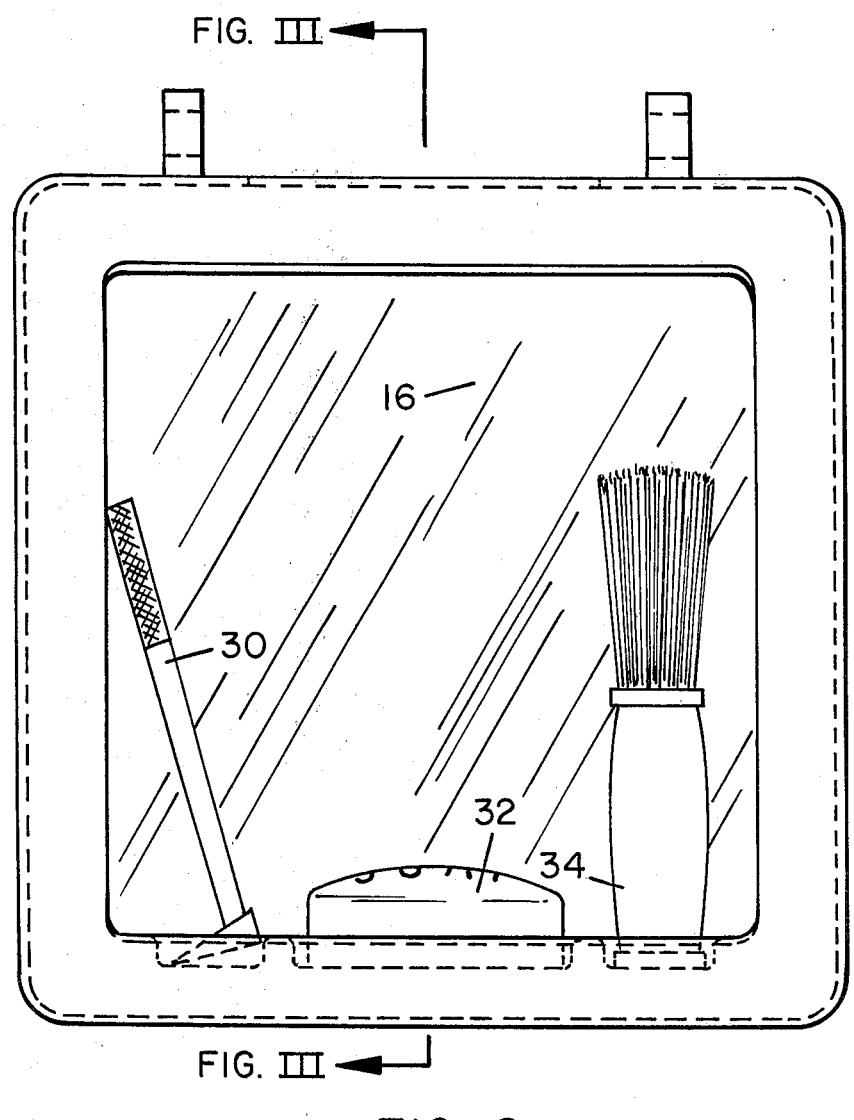
FIG. 2 is a front elevational view of the mirror shown in FIG. 1.
Figure 3:
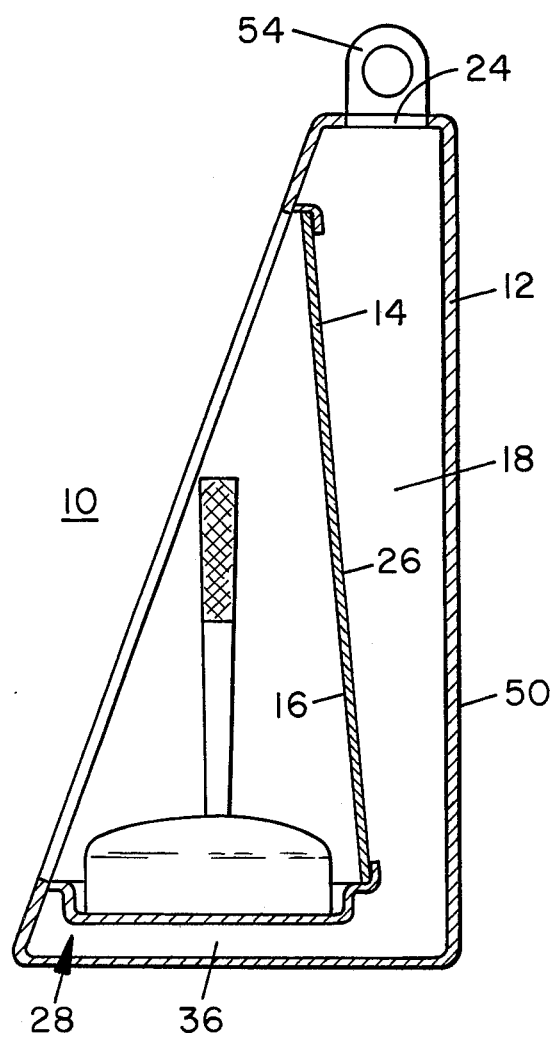
FIG. 3 is a side sectional view of the mirror shown in FIG. 1 taken along the line III—III.
Figure 4:
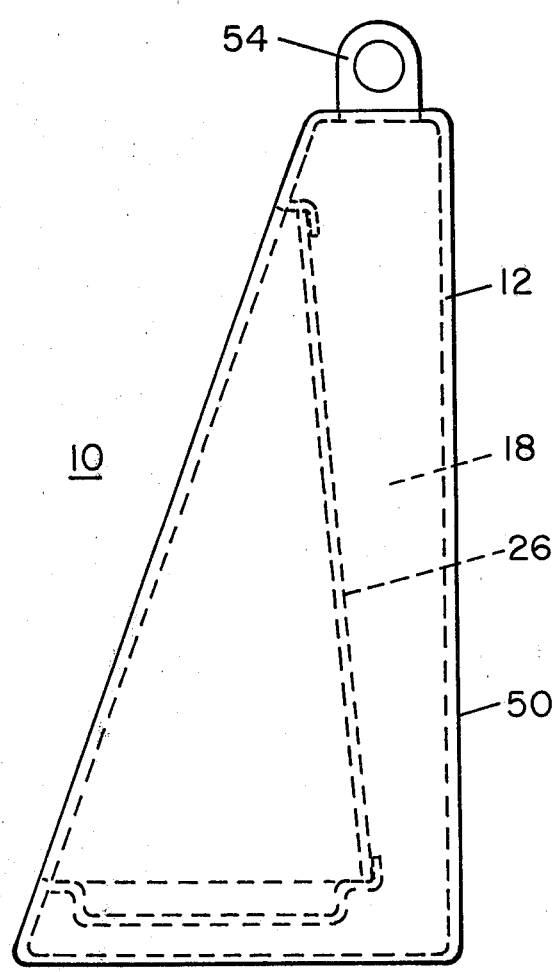
FIG. 4 is a side elevational view of the mirror shown in FIG. 1.
Figure 5:
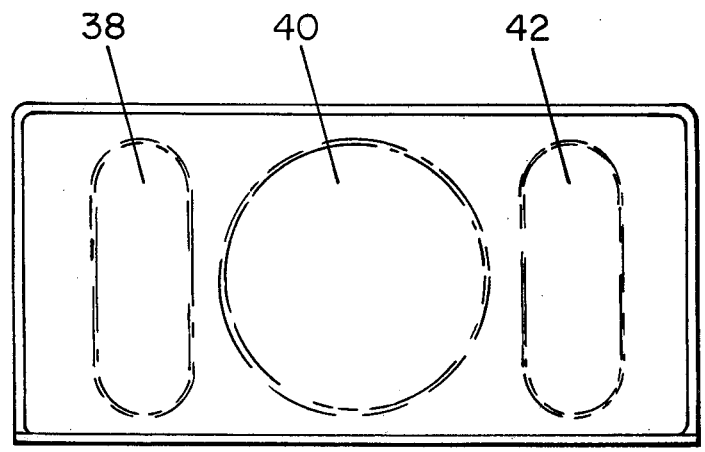
FIG. 5 is a top plan view of the tray of the mirror shown in FIG. 1.
Figure 6:
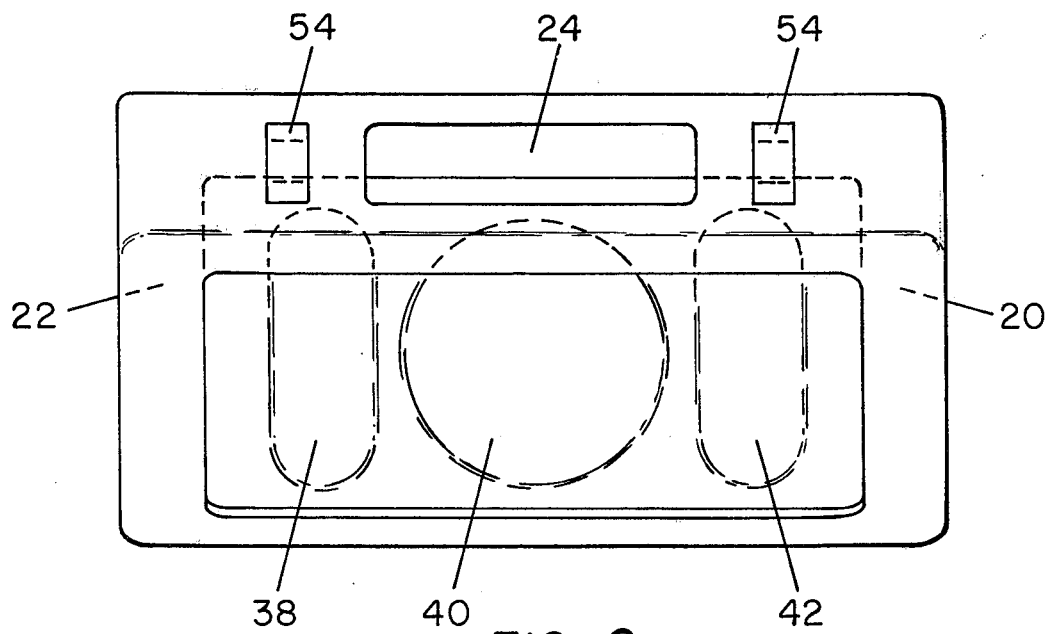
FIG. 6 is a top plan view of the mirror shown in FIG. 1.

FIGS. 1 through 6 show a mirror 10 that is constructed according to the provisions of the present invention. Mirror 10 includes housing 12 and any suitable reflective member 14, such as an ordinary mirror. Reflective member 14 is fixed to housing 12 in any fashion, such as that shown in the drawing, so long as reflective surface 16 of reflective member 14 can be viewed by an individual and reflective member 14 and housing 12 define a liquid-tight housing compartment 18.

The housing compartment can be any shape, but is preferably shaped like housing compartment 18 shown in the drawing. Housing compartment 18 can have side sections 20 and 22. Housing 12 has formed therein an opening 24 that communicates with housing compartment 18. Housing compartment 18 can be filled with hot water through opening 24. Reflective member 14 should be fixed to housing 12 in a fashion such that liquid disposed in housing compartment 18 makes contact with rear surface 26 of reflective member 14.

Mirror 10 can include base 28 for holding shaving articles such as razor 30, shaving soap 32 and shaving brush 34. Base 28 can have formed therein a base compartment 36 that communicates with housing compartment 18. Accordingly, hot tap water can flow from housing compartment 18 to base compartment 36 and heat shaving soap 32 to provide the user with hot shaving lather. Base 28 can include depressions 38, 40 and 42 for receiving razor head 44, shaving soap 32 and brush 34, respectively.

A baffle (not shown) can be fixed within opening 24 that allows a user to fill compartments 18 and 36 with hot water but that retards the escape of heat from compartment 18.

Preferably, rear surface 50 of housing 12 and reflective surface 16 are both planar and are disposed at an acute angle to each other. When mirror 10 is disposed in a shower area so that rear surface 50 is oriented substantially vertically, as shown in the drawing, reflective surface 16 is tilted forward and accumulation of water thereon is retarded.

Any suitable apparatus, such as rope (not shown) and eyelets 54, can be used to temporarily fix mirror 10 within a shower area. If the rope and eyelets 54 are used to so fix mirror 10, the rope can be placed through eyelets 54 and around the shower curtain rod so that mirror 10 can hang therefrom. Alternately, hooks, suction cups or any other suitable apparatus can be used to fix mirror 10 within a shower area. Preferably, such apparatus should permit the user to fix mirror 10 within a shower area, so that the top of reflective surface 16 is tilted toward the user. Such an orientation of surface 16 retards the accumulation of water on reflective surface 16.

To use mirror 10, the user, before taking a shower, fills compartments 18 and 36 through opening 24 with a liquid, such as ordinary tap water, that is at a temperature at least 5° Fahrenheit higher than the shower water with which the user plans to take a shower. Then the user fixes mirror 10 within the shower area and takes a shower. Thereafter, the user can shave while the shower is on or, if the user wishes to conserve water and energy, while the shower is off. When the user finishes shaving, compartment 18 and 36 can be emptied, thereby initializing mirror 10 for the next shower and shave cycle.

What is claimed is:

1. A mirror for use in a steamy or humid environment comprising:
   a housing constructed from a material having low thermal conductivity;
   a reflective member secured to said housing, said reflective member being constructed of a material having low thermal conductivity;
   said housing and a surface of said reflective member defining a compartment for storing a predetermined quantity of a hot liquid behind said surface and maintaining a portion of the liquid in contact with said surface of said reflective member to conduct heat from said liquid to said reflective member;
   said mirror defining an opening that communicates with said compartment through which said compartment can be filled with hot liquid prior to each use of said mirror; and
   said reflective member receiving heat by conduction from static hot liquid disposed within said compartment through said surface and transferring said heat to the reflective surface of said reflective member for preventing said reflective surface from becoming fogged when said mirror is used in a steamy or humid environment.

2. The mirror recited in claim 1 wherein said reflective surface and the rear surface of said housing are planar and said reflective member is oriented on said housing such that the planes including said reflective surface and said rear housing surface intersect at an angle, whereby the accumulation of water on the reflective surface is retarded when the mirror is disposed such that said rear housing surface is oriented substantially vertically in a steamy or humid environment.

3. The mirror claimed in claim 1 further comprising a base fixed to said housing for holding shaving articles.

4. The mirror claimed in claim 3 wherein said base has formed therein a base compartment, said base compartment communicating with said housing compartment so that liquid can flow between said base and housing compartments.

5. The mirror claimed in claim 4 wherein said opening is in communication with said base compartment.

6. The mirror claimed in claim 1 wherein said reflective member is plastic.

7. The mirror claimed in claim 1 wherein said housing is plastic.

8. A mirror for use in steamy or humid environments comprising:
   a housing having a planar rear surface;
   a reflective member, including a planar reflective surface, fixed to said housing, said reflective member being fixed to said housing such that said reflective member and said housing define a liquid-tight housing compartment and being oriented on said housing such that the planes including said reflective surface and said rear housing surface intersect at an angle, whereby the accumulation of water on the reflective surface is retarded when the mirror is disposed such that said rear housing surface is oriented substantially vertically in a steamy or humid environment;
   said housing having an opening formed therein, said opening communicating with said housing compartment so that said housing compartment can be filled with a liquid; and
   attachment means for temporarily fixing said mirror to an object;
   whereby said housing compartment can be filled with a hot liquid so that said reflective surface will not become fogged when said mirror is used in a steamy or humid environment.

* * * * *